United States Patent
Wacker et al.

(10) Patent No.: US 10,953,806 B2
(45) Date of Patent: Mar. 23, 2021

(54) ROOF RACK FOR A MOTOR VEHICLE

(71) Applicant: WKW Engineering GmbH, Wuppertal (DE)

(72) Inventors: Andreas Wacker, Solingen (DE); Michael Hoinka, Heiligenhaus (DE)

(73) Assignee: WKW Engineering GmbH, Wuppertal (DE)

( * ) Notice: Subject to any disclaimer, the term of this patent is extended or adjusted under 35 U.S.C. 154(b) by 0 days.

(21) Appl. No.: 15/929,055

(22) Filed: Oct. 19, 2018

(65) Prior Publication Data
US 2019/0118726 A1 Apr. 25, 2019

(30) Foreign Application Priority Data
Oct. 20, 2017 (DE) .................... 20 2017 106 356.9

(51) Int. Cl.
*B60R 9/04* (2006.01)
*B29C 48/13* (2019.01)
*B21D 26/033* (2011.01)

(52) U.S. Cl.
CPC ............ *B60R 9/04* (2013.01); *B29C 48/13* (2019.02); *B21D 26/033* (2013.01)

(58) Field of Classification Search
CPC .................................. B60R 9/04; B60R 9/05
USPC ................. 224/309, 316, 325–327
See application file for complete search history.

(56) References Cited

U.S. PATENT DOCUMENTS

| | | | | |
|---|---|---|---|---|
| 4,165,827 A | * | 8/1979 | Bott | B60R 9/04 224/326 |
| 6,041,968 A | * | 3/2000 | Weiteder | B65D 5/748 222/545 |
| 9,033,565 B2 | | 5/2015 | Pfeil et al. | |
| 2003/0232160 A1 | * | 12/2003 | Spengler | B29C 35/16 428/34.1 |
| 2009/0020572 A1 | * | 1/2009 | Binder | B60R 9/04 224/309 |
| 2012/0031939 A1 | | 2/2012 | Jutila et al. | |
| 2013/0135880 A1 | | 5/2013 | Michie et al. | |
| 2016/0082880 A1 | | 3/2016 | Co et al. | |

FOREIGN PATENT DOCUMENTS

| | | |
|---|---|---|
| CN | 202624082 U * | 12/2012 |
| DE | 9315848 U1 | 11/1994 |
| DE | 19948475 A1 | 4/2001 |
| DE | 10105167 A1 | 8/2002 |

(Continued)

OTHER PUBLICATIONS

English Translation of DE 10336901.*

*Primary Examiner* — Scott T McNurlen
(74) *Attorney, Agent, or Firm* — Oppedahl Patent Law Firm LLC

(57) ABSTRACT

The invention relates to a roof rack roof rack for a motor vehicle, having a roof rail profile. The roof rail profile is manufactured from a profile that has a constant cross-section in the longitudinal direction of the profile. Roof rail profiles with different designs can be formed from one and the same profile cross-section, namely by the shaping of a side or wall section present on the profile that delimits a passage. The roof rail profile, which preferably is designed as one piece, has different cross-sections in the longitudinal direction, namely unshaped surface sections and shaped surface sections.

14 Claims, 4 Drawing Sheets

(56) References Cited

FOREIGN PATENT DOCUMENTS

| | | | |
|---|---|---|---|
| DE | 10336901 B3 | 5/2005 | |
| DE | 10336901 B3 * | 5/2005 | ............... B60R 9/04 |
| DE | 202009009489 U1 | 10/2009 | |
| DE | 202010002446 U1 | 5/2010 | |
| DE | 102011080578 A1 | 3/2012 | |
| DE | 202014102150 U1 | 5/2014 | |
| DE | 202014010315 U1 * | 4/2015 | ............... B60R 9/05 |
| DE | 102014220630 A1 | 4/2016 | |
| DE | 202016007703 U1 | 1/2017 | |
| DE | 202017106356 U1 | 10/2017 | |
| JP | 2003285128 A | 10/2003 | |
| JP | 2007253928 A | 10/2007 | |
| KR | 101635561 B1 | 7/2016 | |
| WO | 1995011144 A1 | 4/1995 | |

* cited by examiner

ROOF RACK FOR A MOTOR VEHICLE

BACKGROUND OF THE INVENTION

The invention relates to a roof rack for a motor vehicle, having a roof rail profile, which preferably is designed as one piece. Two such roof rail profiles are placed on the roof of the motor vehicle and are attached to the roof by suitable fastening means.

It is known to manufacture roof rail profiles by extrusion and to match them to the roof contour of a vehicle by stretch bending and, if applicable, subsequent processing. Extruded profiles with different cross-sections are known for such a roof rack. However, all roof rail profiles manufactured by extrusion have a cross-section that is constant in the longitudinal direction on account of the manufacturing process. For design reasons, however, a cross-section that is variable over the profile longitudinal axis is also of great interest for vehicle manufacturers. Through the use of a hydroforming process, it is possible to change the cross-section of a tubular profile. To this end, both profile ends are sealed, and a forming medium is introduced into the profile at high pressure through the seal at one end.

In this process, the profile is fully enclosed in a tool that reproduces the negative of the outer contour to be achieved. As a result of the internal pressure, the profile expands until it rests against the tool wall in all areas. By means of such a method, a tubular roof rail can be modified such that the suggestion of railing feet arises at the profile ends and also in the profile center. However, this method has the disadvantage that tooling costs, facility costs, and unit costs of the method are very high. On account of the high pressures that are used, the expanded profile regions are subjected to high stresses and have a reduced wall thickness as compared to the non-expanded regions, which can cause problems during surface finishing, such as polishing or repolishing. Furthermore, such an expansion of the profile is only possible within narrow limits, since cracking may otherwise occur in the profile.

BRIEF SUMMARY OF THE INVENTION

The object of the invention is to specify a roof rack that is economical to manufacture and provides freedom of design over the profile's longitudinal axis.

This object is attained by a roof rack with the features of claim 1. Advantageous embodiments are described by the dependent claims.

A novel roof rack for a motor vehicle includes a roof rail profile. The roof rail profile has at least one open or closed hollow chamber and may include additional closed hollow chambers. The roof rail profile exhibits different cross-sections in the longitudinal direction of the profile. In this design, at least the first lateral surface facing the outside of the vehicle has, in the longitudinal direction of the roof rail profile, unshaped and shaped surface sections, by which means different cross-sections of the roof rail profile are achieved. An open or closed hollow chamber of the roof rail profile represents a passage running in the longitudinal direction of the profile. This passage is located next to a lateral surface of the roof rail profile, and is delimited from this lateral surface by a freely shapeable side or by a shapeable wall section. In the region of the unshaped surface sections, the passage is unchanged. In the region of the shaped surface sections, the shapeable side or the shapeable wall section is shaped in the direction of the passage, which is to say inward into the roof rail profile.

The novel roof rail profile is made from an extruded profile or from a roll-formed profile. In a known manner, appropriate pieces of profile for a roof rail profile are matched to the roof contour of a motor vehicle by stretch-bending. In addition, in this case shaped surface sections for the new roof rail profile are produced on the stretch-bent pieces of profile either before or, in particular, after the stretch-bending. This can take place in that sections in the longitudinal direction of the profile undergo a rolling, pressing, stamping, or impressing of the freely shapeable side or shapeable wall section toward the passage. Because the passage is located next to a lateral surface, and the freely shapeable side or the shapeable wall section extends along the lateral surface, the shaping of the side or wall section gives this lateral surface a contouring and gives the roof rail profile a change in cross-section. The forming is facilitated in this case when the wall thickness of the freely shapeable side or shapeable wall section is less than the wall thickness of the sidewall at the lateral surface where the side or the wall section are located.

In the case of such a shaping, the shaped areas on the lateral surface can be designed to form the suggestion of railing feet at the profile ends or in the profile center of the roof rail profile. It is also possible to provide the sides or the shapeable wall sections at the lateral surfaces of the roof rail profile with a desired contour through forming, or even to stamp them with an inscription or another symbol.

In the simplest manner, the roof rail profile constitutes a U-shaped roll-formed profile that has a profile wall on the top and on the two lateral surfaces, which delimit an open hollow chamber, in other words form a passage that runs in the longitudinal direction of the profile and is open toward the bottom. In this case, the sidewalls of the roof rail profile are the shapeable sides that delimit this passage. One or both sides can be shaped as desired by a forming operation, namely by a force acting on the lateral surfaces in the direction of the passage, by which means a roof rail profile with a cross-sectional change on at least one side is produced.

In a preferred embodiment, the roof rail profile is made of an extruded profile and has at least one open hollow chamber and, in addition, at least one closed hollow chamber. One or more closed hollow chambers extend from the top to the bottom of the roof rail profile in this design, and ensure good stability for the roof rack. Here, the open passage running in the longitudinal direction is arranged such that a side that delimits the passage to the outside runs along one lateral surface, preferably the visible side.

In one embodiment, the passage formed by the open hollow chamber of the roof rail profile is open downward, which is to say toward the bottom of the roof rail profile. In this case, the freely shapeable side constitutes one wall of the passage and extends along the lateral surface, with its free end facing the bottom of the roof rail profile. The additional, second side delimiting the passage is part of the wall of a closed or open hollow profile chamber of the roof rail profile. This second side is not shaped. In a preferred embodiment, the open passage running in the longitudinal direction of the extruded profile is U-shaped. In the unshaped surface sections of the roof rail profile, the open passage is preserved even after the shaping, and is delimited from the lateral surface by the freely shapeable side. In the region of the shaped surface sections, this side is bent toward the passage. The bending of the side can take place up to the opposite, second side of the passage or the opposite passage wall, so that the passage is, if applicable, closed in these shaped surface sections. The shaping of the first side can also be delimited by a stop bead provided on the second side.

In another exemplary embodiment, the passage constitutes a longitudinal groove in the lateral surface. The opening of the passage faces the lateral surface and in this design is covered except for a gap by at least one freely shapeable side. In this case, too, the freely shapeable side extends along the lateral surface, with its free end facing the top or the bottom of the roof rail profile.

From an original extruded or roll-formed profile with constant cross section, it is possible in advantageous fashion to achieve roof rail profiles with varying design in the longitudinal direction of the profile, namely through shaping of the side or wall section delimiting the open passage, wherein the shaping force acts on the roof rail profile in a simple manner from outside. This makes a variety of design options available for a roof rack, and with relatively low manufacturing costs.

BRIEF DESCRIPTION OF THE SEVERAL VIEWS OF THE DRAWINGS

The invention is explained below on the basis of the drawings and various exemplary embodiments. The drawings show.

DETAILED DESCRIPTION OF THE INVENTION

Figure 1:
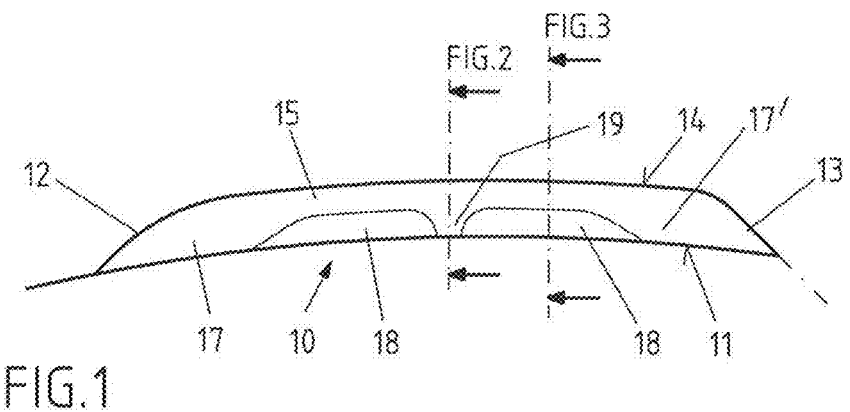
FIG. 1 the side view of a roof rack.
Figure 2:
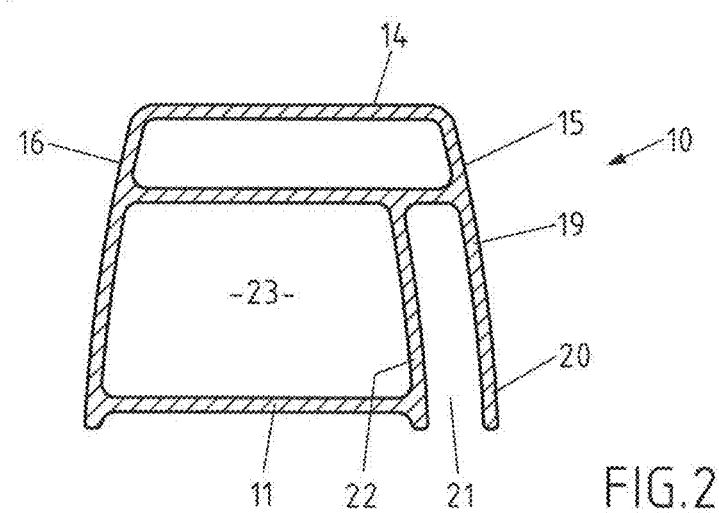
FIG. 2 an enlarged cross-section through the roof rail profile from FIG. 1.
Figure 3:
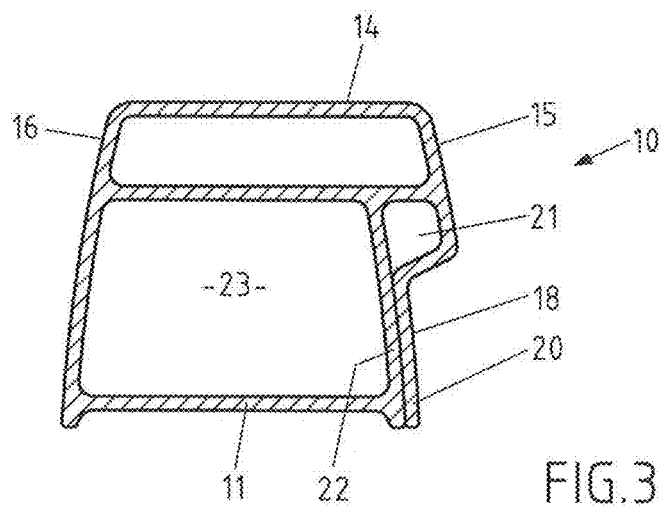
FIG. 3 another cross-section through the roof rail profile from FIG. 1.

FIG. 1 shows a roof rail profile 10 of a roof rack that is placed on the roof of a motor vehicle and is attached to the roof by known fastening means. In FIG. 1, the roof is indicated by a dashed line. The bottom 11 of this roof rail profile 10 rests on the roof contour. Shaped surface sections 18, and unshaped surface sections 17, 17', 19 are provided on the visible lateral surface 15 of the roof rail profile 10. The unshaped surface sections 17, 17' at the front end 12 and the back end 13 of the roof rail profile 10 have the form of a railing foot. The unshaped surface section 19 in the central region of the roof rail profile 10 has the form of a center foot. This form is achieved by means of the shaped regions 18. In these regions 18, the roof rail profile 10 has an altered cross section. This is more readily evident from the cross-sectional views. FIG. 2 shows a cross-section in the region of the suggested middle foot 19 where no additional shaping was carried out. It is clear that the roof rail profile 10 is a hollow-chamber profile produced by extrusion with two closed hollow chambers and one open hollow chamber. It has a top 14, a bottom 11, and lateral surfaces 15, 16. The lateral surface 15 faces the outside of the vehicle and includes a side 20 that delimits a U-shaped passage 21 that is open at the bottom. The second side 22, which delimits the passage 21, is part of the wall that forms the closed hollow chamber 23. The first side 20, which runs along the lateral surface 15, extends at its free end to the bottom 11. In the regions where shaped sections 18 are provided on the lateral surface 15, this side 20 is bent in the direction of the passage 21 by an external bending force, as shown in FIG. 3. This first side 20 has been bent in the direction of the passage 21 until it contacts the second side 22. In this region, where shaped sections 18 are present, the passage 21 is a closed passage 21 in this case. A roof rack of this nature can be manufactured as follows. An extruded profile having the cross-section shown in FIG. 1 is produced by extrusion, and suitable lengths are cut from the extruded profile and matched to the roof contour, see FIG. 1, by stretch-bending. Next, the freely shapeable side 20 is shaped in the desired sections of the extruded profile by a shaping operation. This can be accomplished by the means that, for example, suitable bending inserts are used during stretch bending that have recessed contours in the regions intended for shaping. After stretch-bending, forming can then be carried out at the lateral surface 15 by a contoured roller or by an embossing or stamping die. In comparison with a hydroforming step, the tooling and per-piece costs are significantly more economical in a forming operation of this nature.

Figure 4:
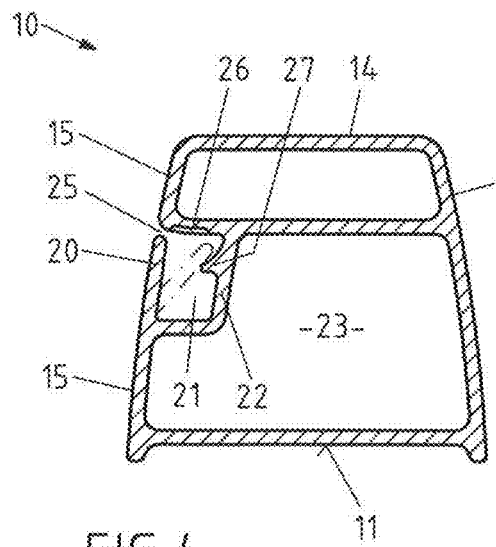
FIG. 4 a cross-section through another roof rail profile.
Figure 5:
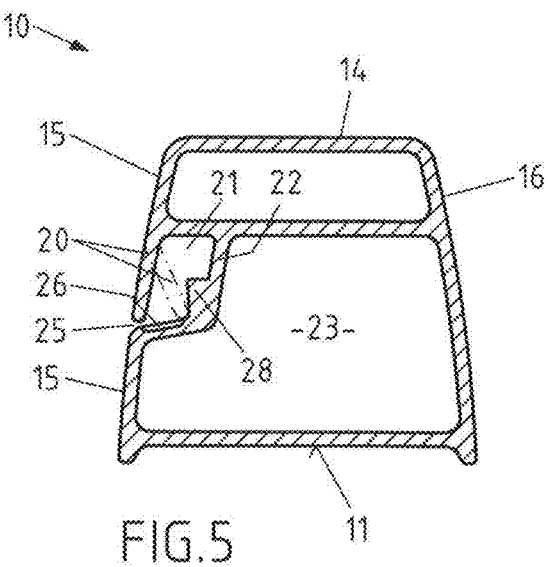
FIG. 5 a cross-section through another roof rail profile.

FIG. 4 and FIG. 5 show additional cross-sections through a roof rail profile 10 produced by extrusion. This roof rail profile 10 is also a hollow-chamber profile with a passage 21 running in the longitudinal direction. This passage 21 constitutes a groove in the lateral surface 15 running in the longitudinal direction of the profile that is covered on the outside by the freely shapeable side 20, except for the gap 15. In this case, the shapeable free side 20 is provided in the center of the profile. This side 20 can also be bent inward toward the passage 21. Provided on the opposite side 22 of the passage 21 is a stop bead 27 that limits the shaping travel of the side 20. The shaped side 20 is shown in dashed lines. In the regions of the roof rail profile where the shaped side 20 is bent into the passage 21, a recessed region 26 of the lateral surface 15 is visible. This region 26 can additionally have a surface structuring introduced during extrusion or later.

FIG. 5 shows a modified roof rail profile 10. Here, too, a passage 21 is provided on the lateral surface 15 that is closed, except for a gap 25, by the shapeable side 20. In this case, the free end of the side 20 faces toward the bottom 11 of the roof rail profile, unlike the case shown in FIG. 4 where this free end faces the top 14 of the profile 10. In the same manner, the freely shapeable side 20 can be pressed into the passage 21, wherein the shaping travel is also limited in this case by a stop bead 28 on the side 22.

Figure 6:
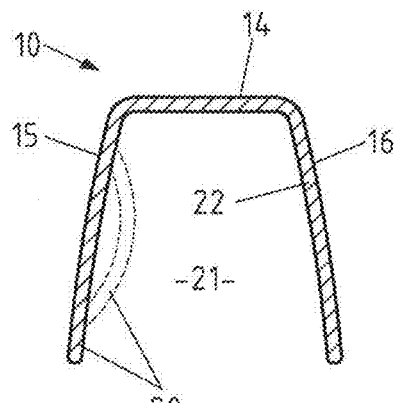
FIG. 6 a cross-section through another roof rail profile.
Figure 7A:
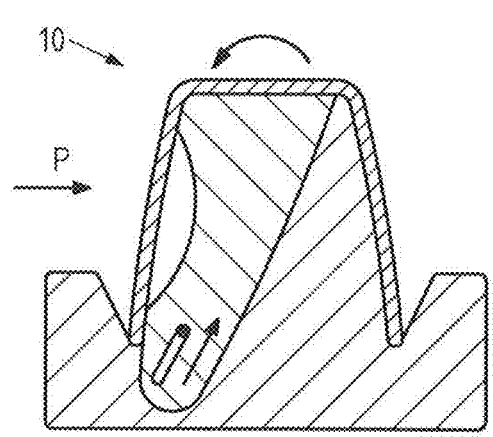
FIG. 7a a roll-formed profile prior to shaping.
Figure 7B:
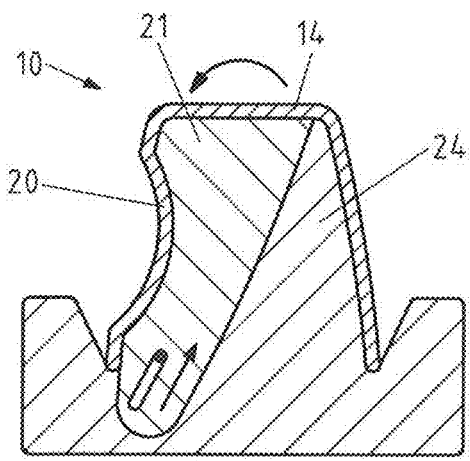
FIG. 7b a roll-formed profile after shaping.

FIG. 6 shows another cross-section through a roof rail profile 10. In this case, the roof rail profile 10 consists only of the walls of the lateral surfaces 15, 16 and the top 14. These three walls delimit a passage 21. A profile 10 of this nature can be manufactured by roll-forming or extrusion from aluminum or an aluminum alloy, preferably by roll-forming. Different cross-sections in the longitudinal direction are provided in the case of this profile 10, as well. It is indicated in FIG. 6 that the lateral surface 15 represents a freely shapeable side 20 that is shaped in the direction of the passage 21, in other words, into the interior of the profile 10. This would also be possible in the same manner for the side 22 of the lateral surface 16 with this profile 10. FIGS. 7a, 7b that follow show one possibility for introducing such a shaping. The roll-formed profile 10 is positioned on a suitable core. This can be, for example, a bending insert of the stretch-bender. After stretch bending, a tool is pressed against the side 20 that is to be formed. This is indicated in FIG. 7a by the arrow P. The core on which the profile is located consists in this case of a two-piece template, wherein the left half of the template is designed to be movable, indicated by the arrow next to the elongated hole. After the shaping operation, see FIG. 7b, the desired shapings of the side 20 have been made in the desired surface sections of the lateral surface 15. The movable half of the template is displaced upward in the direction of the arrow, is rotated, and the profile 10 can then be removed from the core.

Figure 8:
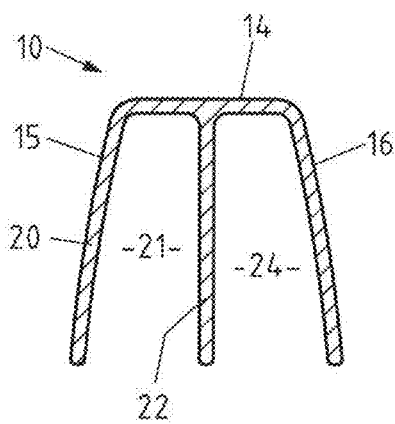
FIG. 8 a cross-section of another roof rail profile.
Figure 8A:
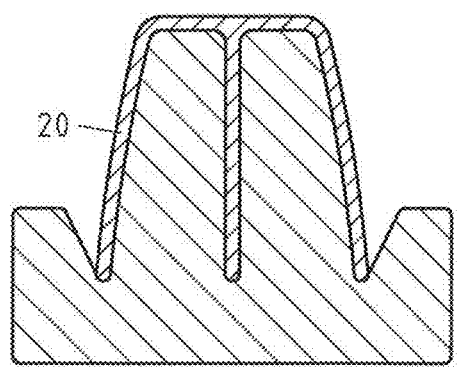
FIG. 8a the roof rail profile from FIG. 8 prior to shaping.
Figure 8B:
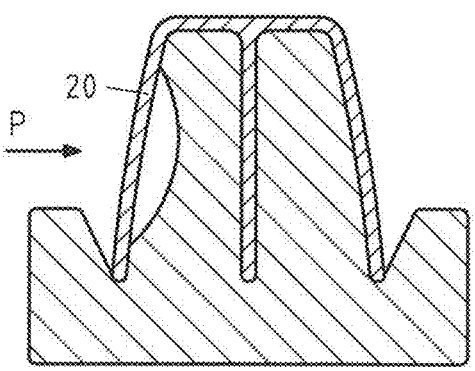
FIG. 8b the roof rail profile according to FIG. 8 prior to shaping.
Figure 8C:
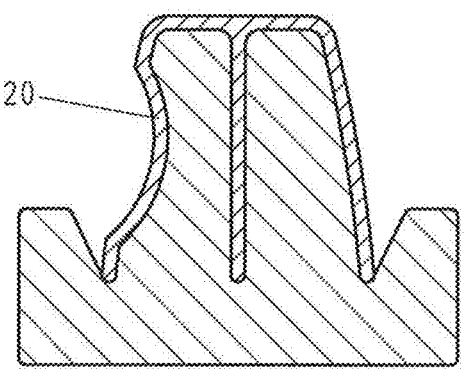
FIG. 8c the roof rail profile from FIG. 8 after shaping.

FIG. 8 shows another cross-section of a roof rail profile 10. It has a top and two lateral surfaces 15, 16. The lateral surfaces 15, 16 each delimit a passage 21, 14 that is open to the bottom. The lateral surface 15 facing the outside of the vehicle represents the first freely shapeable side 20, which is shaped toward the passage 21 in the desired sections in the longitudinal direction of the roof rail profile 10. This passage 21 is additionally formed by the top 14 and an additional side 22 located in the center of the profile. This side 22 remains unshaped. Naturally—if desired—the lateral surface 16 could also serve as a freeform surface. The profile, manufactured by extrusion and cut to a suitable length, is placed on a suitable core for stretch bending, and bending inserts engage inside the passages 21, 24 of the profile (see FIG. 8a). Bending inserts are necessary to avoid creating sink marks during stretch bending, and serve as backrests during the shaping operation. The bending inserts are recessed in the regions where stamping is to take place after stretch bending. In this case too, the bending insert on the left preferably is made movable so that it serves as a withdrawal aid, as shown in FIG. 7b.

Depending on the desired profile shape, the forming can also take place before the stretch bending. In this case, a tool is pressed against the profile surface to be formed, either freely or against a core that is inserted into the profile and is also used for the stretch bending operation. This tool is pressed against the appropriate profile regions, for example, a contoured roller that is moved by a suitable pressing mechanism along the region to be formed, or a die with the negative contour is pressed against the region that is to be formed.

A roof rail profile 10 manufactured in this way can be subjected to known surface finishing processes in order to achieve a desired surface through grinding, polishing, anodizing, painting or powder coating.

Figure 9:
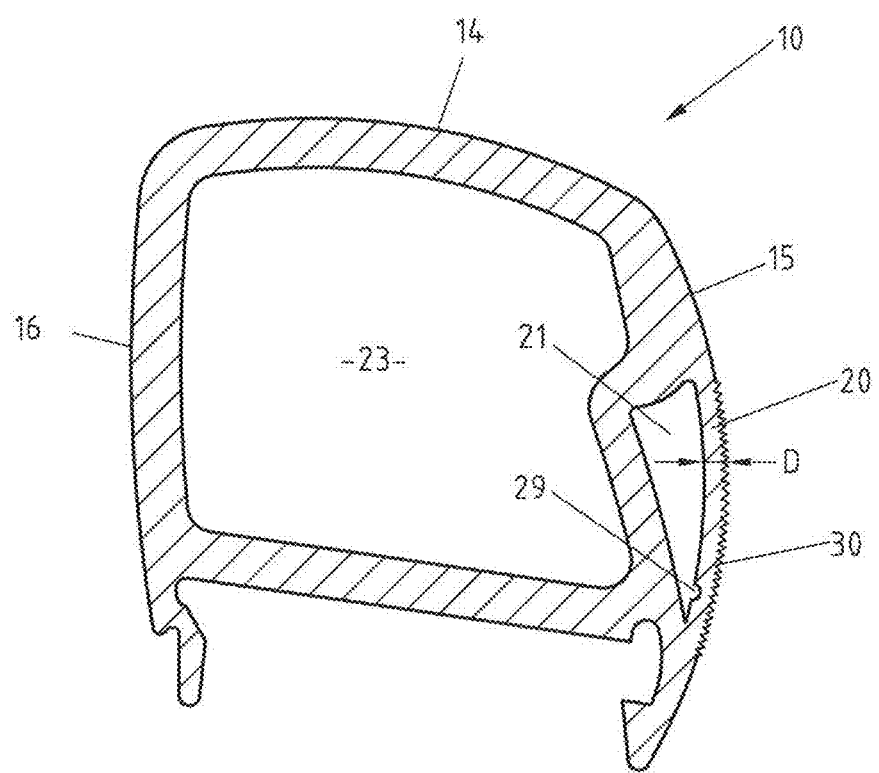
FIG. 9 a cross-section of another roof rail profile.

FIG. 9 shows another cross-section of a roof rail profile 10 manufactured by extrusion.

This roof rail profile 10 is also a hollow-chamber profile, namely with two hollow chambers 21, 23 running in the longitudinal direction. The one hollow chamber 23 is enclosed by the walls 14, 15, 16 and a floor. Running adjacent thereto is another hollow chamber, namely the closed passage 21, which is delimited from the outside by a shapeable wall section 20', comparable to the sides 20' of the previous examples.

The wall thickness D of the wall section 20' is dimensioned to be less than the wall thickness of the walls of the roof rail profile 10, which facilitates the forming. This wall thickness D can be less than 1 mm. Both ends of the wall section 20' transition into the lateral surface 15. The shapeable wall section 20' can be bent inward toward the passage 21 by a shaping force from the outside. In this case, the shapeable wall section 20' additionally has a wall weakening for this purpose in the form of a depression 29 that is introduced by extrusion. A depression 29 of this nature permits smaller outside radii during forming.

To visually conceal the seams, this wall section 20' is provided with a surface texture 30. In this example, this is a corrugation of the outer surface created by extrusion.

LIST OF REFERENCE CHARACTERS 10 roof rail profile
11 bottom
12 front end
13 back end
14 top
15 lateral surface, outer
16 lateral surface, inner
17, 17' unshaped surface section, foot
18 shaped surface sections
19 unshaped surface section, center foot
20, 20' side, wall section
21 passage
22 side
23 closed hollow chamber
24 open hollow chamber
25 gap
26 recessed region of 15
27 stop bead
28 stop bead
29 wall weakening, depression
30 surface texture
D wall thickness

The invention claimed is:

1. A roof rack for a motor vehicle, the motor vehicle having a roof contour, the motor vehicle having an outside, the roof rack made of a roof rail profile (10) that has at least a top (14) and two lateral surfaces (15, 16), the roof rail profile having a longitudinal direction, wherein the roof rail profile (10) has different cross-sections in the longitudinal direction,
   in that the roof rail profile (10) has a bottom (11) which rests on the roof contour of the motor vehicle,
   in that the roof rail profile (10) is made from an extruded profile or from a roll-formed profile, which has been matched to the roof contour of the motor vehicle by stretch-bending,
   characterized in that
   the first lateral surface (15) facing the outside of the vehicle has, in the longitudinal direction of the roof rail profile (10), first surface sections (17, 17', 19) and shaped second surface sections (18),
   in which the first surface sections (17, 17', 19) provided at the front end (12) and at the back end (13) of the roof rail profile (10), and have the form of railing feet,
   in which the second surface sections (18) have been produced by rolling, pressing, stamping, or impressing after the stretch-bending,
   wherein the roof rail profile (10) has different cross-sections in the longitudinal direction by the first surface sections (17, 17', 19) and the shaped second surface sections (18),
   and in that the roof rail profile (10) has, in the region of the first surface sections (17, 17', 19), next to the first lateral surface (15), an open or closed passage (21) that is delimited by at least a first side (20) or wall section (20') running along the lateral surface (15), and wherein the shaped surface sections (18) are formed by a shaping force acting from the outside on this side (20) or wall section (20').

2. The roof rack according to claim 1, wherein the roof rail profile has a central area, the roof rack characterized in that another unshaped surface section (19) that has the form of a center foot is provided in the central area of the roof rail profile (10).

3. The roof rack according to claim 1, characterized in that the shaped surface sections contain patterns, inscriptions, or logos.

4. The roof rack according to claim 1, characterized in that the profile is extruded, wherein the profile has an open passage (21) running in the longitudinal direction of the profile that is formed on the one hand by the first side (20) extending along the lateral surface (15) and on the other hand by a second side (22) that delimits a closed or open hollow profile chamber (23, 24) of the extruded profile, wherein the second side (22) is not additionally shaped.

5. The roof rack according to claim 4, characterized in that the passage (21) running in the longitudinal direction of the roof rail profile (10) is U-shaped and is open downward in the region of the first surface sections.

6. The roof rack according to claim 1, characterized in that the shaped surface sections (18) of the lateral surface (15) are produced by rolling, pressing, stamping, or impressing sections of the freely shapeable first side (20) or of the shapeable wall section (20') toward the passage (21).

7. The roof rack according to claim 1, characterized in that the first side (20) extends to a bottom (11) of the roof rail profile (10).

8. The roof rack according to claim 1, characterized in that the first side (20) extends within a center region with respect to the height of the lateral surface (15).

9. The roof rack according to claim 1, characterized in that a free end of the first side extends toward a bottom (11).

10. The roof rack according to claim 1 wherein the roof rail profile has sidewalls, characterized in that the open or closed passage (21) is a closed passage running in the longitudinal direction of the roof rail profile (10) is covered by the wall section (20') that has a smaller wall thickness (D) than the sidewalls of the roof rail profile (10).

11. The roof rack according to claim 10, characterized in that the wall section (20') that delimits the passage (21) from the outside has a wall weakening (29) on its inside that facilitates the forming.

12. The roof rack according to claim 10, characterized in that the wall section (20') is provided on its outside with a surface texturing (30).

13. The roof rack according to claim 12 where the surface texturing is a corrugation introduced by extrusion.

14. The roof rack according to claim 1, characterized in that the roof rail profile (10) is made of aluminum, of an aluminum alloy, or of stainless steel.

* * * * *